United States Patent [19]

Fischer et al.

[11] Patent Number: 5,139,337
[45] Date of Patent: Aug. 18, 1992

[54] METHOD AND APPARATUS FOR THE LINEAR TRANSPORT OF MATERIALS IN ROLL AND SHEET FORM

[75] Inventors: Gerhard Fischer, Dietzenbach; Andreas Herden, Darmstadt, both of Fed. Rep. of Germany

[73] Assignee: E. I. du Pont de Nemours and Company, Wilmington, Del.

[21] Appl. No.: 576,985

[22] Filed: Sep. 5, 1990

[30] Foreign Application Priority Data

Nov. 7, 1989 [DE] Fed. Rep. of Germany ....... 3937020

[51] Int. Cl.⁵ .............................................. G01B 9/02
[52] U.S. Cl. .................................. 356/358; 356/356; 226/162

[58] Field of Search ................. 356/356, 358; 226/162

[56] References Cited

U.S. PATENT DOCUMENTS

| | | | |
|---|---|---|---|
| 3,454,206 | 7/1969 | Williams | 226/162 |
| 3,779,647 | 12/1973 | Dawson | 356/358 |
| 4,378,160 | 3/1983 | Vlad et al. | 356/358 |

Primary Examiner—Samuel A. Turner
Assistant Examiner—Richard E. Kurtz, II

[57] ABSTRACT

In a method and apparatus for linear transport of sheet and web material by piezotranslators, the longitudinal displacement is measured by an optical interferometer and the interferometer output is utilized to control the longitudinally acting piezotranslators.

49 Claims, 3 Drawing Sheets

METHOD AND APPARATUS FOR THE LINEAR TRANSPORT OF MATERIALS IN ROLL AND SHEET FORM

BACKGROUND OF THE INVENTION

This invention relates to a process and device for the transport of materials in roll and sheet form, particularly the linear transport of recording materials in an image recording device and of image-bearing materials in a scanning device.

DESCRIPTION OF THE RELATED ART

In electronic image processing, input and output processes are used in which either existing images are scanned linewise with a scanning device or image information available as electrical signals is recorded in the form of an image with an appropriately controlled writing device. For this purpose, materials in roll or sheet form, for example, photographic roll films, papers or sheet films either bearing images or on which images are to be recorded, are moved past an appropriately controlled writing device, for example, a laser, a thermal printing head, or an ink jet printing head, or past a scanning device. This movement must be as uniform and as reproducible as possible to avoid distortions in the recording. This is especially important if multiple monochromatic separation images are to be recorded successively on the same surface of the material for a polychromatic record.

Conventional scanners transport recording materials with the aid of rollers. These transport rollers are designed as large as possible to transfer adequate frictional force onto the material and to achieve continuous uniform motion. On the other hand, compact construction of the apparatus is desirable, thus limiting the possibility of using large rollers. The accuracy of transport must be sufficiently high that a flaw in an entire image is not greater than a fraction of a line spacing, thus not greater than 40 μm in practice. This requires high mechanical precision and causes significant expense in manufacturing. It is also difficult to adapt such transport devices to the physical properties of different recording materials, for example, thickness or roughness, without losing precision.

U.S. Pat. No. 3,454,206 describes a film transport device in which three piezotranslators (structural elements that change length on the application of electrical voltage) are positioned on a rack. The film is alternately gripped by two of these translators, which each form a clamping device with suitable opposing bearings for each, while the third moves the clamping devices in the same alternating rhythm periodically towards and away from each other. Thus, the film is transported stepwise.

German 3,516,324/A1 discloses a linear motor containing the same elements, but cinematically reversed. The rotor assembly has a group of piezotranslators on each end and is clamped alternately with each end on a stator, while a third group of translators periodically changes the length of the rotor assembly.

Processes operating stepwise are fundamentally better suited than processes with steadily moving material for linewise recording or scanning of images. In the former, it is easy to have the roll material motionless during a line sweep and to have the line shift take place in the pause between individual lines, namely, during the beam return in the recording. This approach avoids distortions arising during steady movement, distortions that result in elliptical or rhomboid instead of circular or square screen dots. As the mass and therefore the inertia of the moving parts is low, processes and devices using the piezotranslators approach appear to be particularly useful. In contrast, the high moment of inertia of large transport rollers requires large forces for stepwise operation.

However, a shortcoming of known piezotranslator transport devices is that the lateral deflection of the translators depends on load and temperature and is subject to pronounced hysteresis. This hysteresis can be up to 10% of the transport path. Hence, for example, the mass moment of inertia or the weight per unit area, as well as a temperature change during operation, disrupt the constancy of transport speed. The step frequency and the amplitudes of the control voltages also affect transport speed and must be controlled accurately.

An object of the invention is to provide a method for the stepwise, linear transport of materials in roll form and sheet form for linewise recording or scanning of images, in which process the step length is not markedly changed by disruptive variables.

Another object is to provide a method in which a very uniform and reproducible average transport speed is achieved without needing to maintain specific values accurately for step frequency and control voltage amplitude.

Another object is to provide an apparatus to perform the method of the invention.

Applicants' achievement of these objects include a method in accordance with appended claim 1 and apparatus in accordance with appended claim 7.

SUMMARY OF THE INVENTION

The expression "transport step" means here that step of the method in which the clamping device gripping the material is moved relative to the framework by the length change in the piezotranslators of the third group, so that the material is transported relative to the framework. Depending on whether this length change is an elongation or a contraction, transport can take place in either direction.

Each transport step takes place in the pauses between the lines of the recording or scanning process. At that time, it is necessary to synchronize transport steps and scanning line returns. Hence, the control signal needed to start the transport step is derived most simply from a periodic signal, which also controls the scanning line signal of the recording or scanning device. However, the length of each transport step is controlled independently of this signal according to a predetermined constant or chronologically variable goal value with the aid of the interferometer assembly. In a preferred embodiment of the process, the signals for the start of the transport step, for the actuation of the clamping device, and for the scanning line return are derived from a common base signal for the dotwise image recording or scanning. This can originate, for example, from a counting circuit-breaker.

The output signal of the interferometer assembly assumes generally a series of peak values (minimums or maximums) in the time period of one transport step effected by the elongation or contraction of the third group of piezotranslators. Depending on the type of interferometer used, a peak value occurs if the mobile clamping device is shifted by a distance equal to a specific fraction of the wavelength $\lambda$ of the measurement light. A preferred embodiment uses an interferometer assembly with a Michelson interferometer and a photoelectric detector. In this case, a peak value in the electrical output signal is observed after each shift by $\lambda/4$.

Similarly, the signal often goes through the average value or also through a reversal point, which, in the case of a sinusoidal signal (e.g. for a linear detector characteristic) is at the average value of the signal. In the method of the invention, the elongation or contraction of the third group of piezotranslators is now interrupted, because the increase in the actuation voltage for these translators is interrupted if the output signal of the interferometer assembly passes through a specific predetermined number of peak values or reversal points, counted from the beginning of the transport step. A suitable counting circuit can be used for this purpose.

In a preferred embodiment, the detector output signal is conducted through a impulse shaper circuit that produces a spike impulse at each peak value or at each passage through the average value (reversal point). This can be, for example, a Schmitt trigger circuit with a differentiation element.

In general, constant average transport speed is desired over the entire image length so that the goal value for the number of peak values to be counted is held constant as to time. However, it is easily possible also to vary this goal value as to time, if somewhat varying parts of the image with different scanning line densities, that is, different step lengths, are to be processed.

The accuracy of the process satisfies practical requirements For example, at $\lambda = 800$ nm, the size of the entire recording would correspond to DIN A 4 (length about 30 cm) and the recording would occur at 1000 lines per centimeter. It is easily possible to determine the position of the peak value of the reversal point at which the individual transport step should be interrupted for each individual step with an accuracy corresponding to a tenth of the spacing of the peak values. Then, the greatest expected error in an individual transport step is 20 nm, if the above-mentioned Michelson interferometer is used. The standard deviation over the entire length (30,000 transport steps) in this case of a relatively fine recording is 3.4 $\mu$m, that is, a third of the line spacing.

The length of the individual transport step or line spacing in the process of the invention can be adjusted by a series of discrete values. Because the spacing of these values can be limited at most $\lambda/4$, thus, 200 nm according to the above example, this means no limitation in practice with line spacings in the order of magnitude of 100 $\mu$m. If, as an exception, an average line spacing is desired lying between two possible discrete values, this can be accomplished by having the two possible discrete spacings alternate in suitable succession. The line spacing can also be changed quasi-continuously and very reproducibly, because it is controlled digitally.

Apparatus to accomplish the method of the invention comprises a framework (stator, housing) bearing two clamping devices each actuated by a group of piezotranslators and a third group of piezotranslators that can vary the spacing of the two clamping devices. In addition, there is an interferometer assembly comprising an optical interferometer, a suitable light source and a detector that produces an output signal and is so positioned that the output signal is a specific function of the spacing of the two clamping devices. In addition, a suitable device has electrical and electronic means to activate and control the piezotranslators.

The clamping devices can each comprise a piezotranslator and an opposing bearing, in accordance with the model in U.S. Pat. No. 3,454,206, whereby both translators are attached to the framework and the third translator varies periodically the spacing of the opposing bearings. In that device, however, an elastic deformation of at least one translator occurs. The force necessary for this is translated lengthwise into frictional engagement on the film, so that transport can be faulty due to slippage, and scratches can originate on the film. Therefore, a construction is preferred in which both components of the second clamping device are attached to the framework not directly, but rather through the piezotranslators of the third group. Thus, the second clamping device can be moved as a whole relative to the framework and only the light force required to overcome its inertia has to be transmitted to the film.

The interferometer assembly consists preferably of a Michelson interferometer, a laser diode as a monochromatic, coherent light source and a photoelectric detector, for example, a photodiode. If the end mirrors of the interferometer are attached to the two clamping devices, their spacing variation is measured directly. For this, the interferometer can be extended with a tilted mirror. In a preferred embodiment, the first clamping device and all components of the interferometer assembly except one interferometer end mirror fixed on the second clamping device are attached to the framework. In this arrangement, the interferometer measures the movement of the second clamping device relative to the framework, thus indirectly, also its spacing from the first clamping device.

If the material to be transported has a larger width, it is advisable to distribute the clamping devices and the piezotranslators of the third group linked to them in several places over the width, for example, twice to both edges of the material.

The piezotranslators of the third group linking opposite parts of the clamping devices must be as equal as possible from the standpoint of their electrical and mechanical properties if only one interferometer is used, so that the control signal obtained from the measurement on one translator causes the same movement in all translators of the third group. The expense of producing translators thus mutually adapted can be considerable. Therefore, a possible alternative is for each piezotranslator of the third group to be measured and controlled by its own interferometer assembly. By the use of low cost interferometers and control mechanisms, this can be more economical.

Each group of piezotranslators has a control mechanism, which, subject to an external signal, switches on and off at a maximum or minimum value, with a definable slope, the voltage applied to the translators. In addition, the control mechanism for the third group of piezotranslators must be able to hold the voltage increase on the slope before reaching the maximum value on an external signal. Obviously, more than one of these control mechanisms must be present if the piezotranslators of the third group are controlled by more than one interferometer assembly.

The means for producing on and off signals for the control mechanism can be, for example, a counting switch, which uses the same high frequency signal that also determines the impulse sequence for recording or scanning and directly for the line scan. A second counting switch receives the interferometer detector output signal and after a preselected number of peak values, halts the voltage increase in the output of the control mechanism for the third group of piezotranslators.

Suitable piezotranslators for the construction of the apparatus of the instant invention are commercially available. Low cost versions for the essential construction elements of the interferometer assembly are easily obtainable, for example, those provided for use in compact disk players.

The transport device of the instant invention can be adapted easily to handle various thicknesses of the material to be transported. For example, if commercial translators with an operating span of 100 $\mu$m are used for the clamping devices, materials with thicknesses in the region of approximately from 50 $\mu$m to 200 $\mu$m can be processed without mechanically adjusting the device. The piezotranslators have a finite stiffness, that is, they exert a finite pressure if they cannot fully perform the length change corresponding to the actuation voltage. Therefore, the pressure of the clamping device on the material can be easily controlled by adjusting the maximum actuation voltage, so that reliable transport is assured on one hand and on the other hand, material damage from high pressure is avoided.

Simple changes in the switching sequence can reverse the transport direction of the material, if it is sufficiently rigid. This can be done in multiple recordings (e.g. polychromatic images). Recording can be conducted equally well either on forward or backward travel, or a rapid return without recording can be inserted after each forward passage. Such a procedure is possible only with great difficulty with previous rollers due to play in the mechanical drives.

Similarly, average transport speed can be varied by wholly electrical switching systems, if, for example, recording must be conducted more slowly perhaps due to lower light-sensitivity of the recording material and limited intensity of the recording light. This can be done, for example, by reprogramming the counting switch that shunts off the control signal for the transport and the line return from the base frequency generator.

DETAILED DESCRIPTION OF A PREFERRED EMBODIMENT

A preferred embodiment of the method and apparatus of the instant invention is specifically illustrated with the aid of the following example. For simplification, the operation is shown in an image recording device. Nevertheless, the invention can also be used in a fully equivalent manner in an image scanning device.

Figure 1:
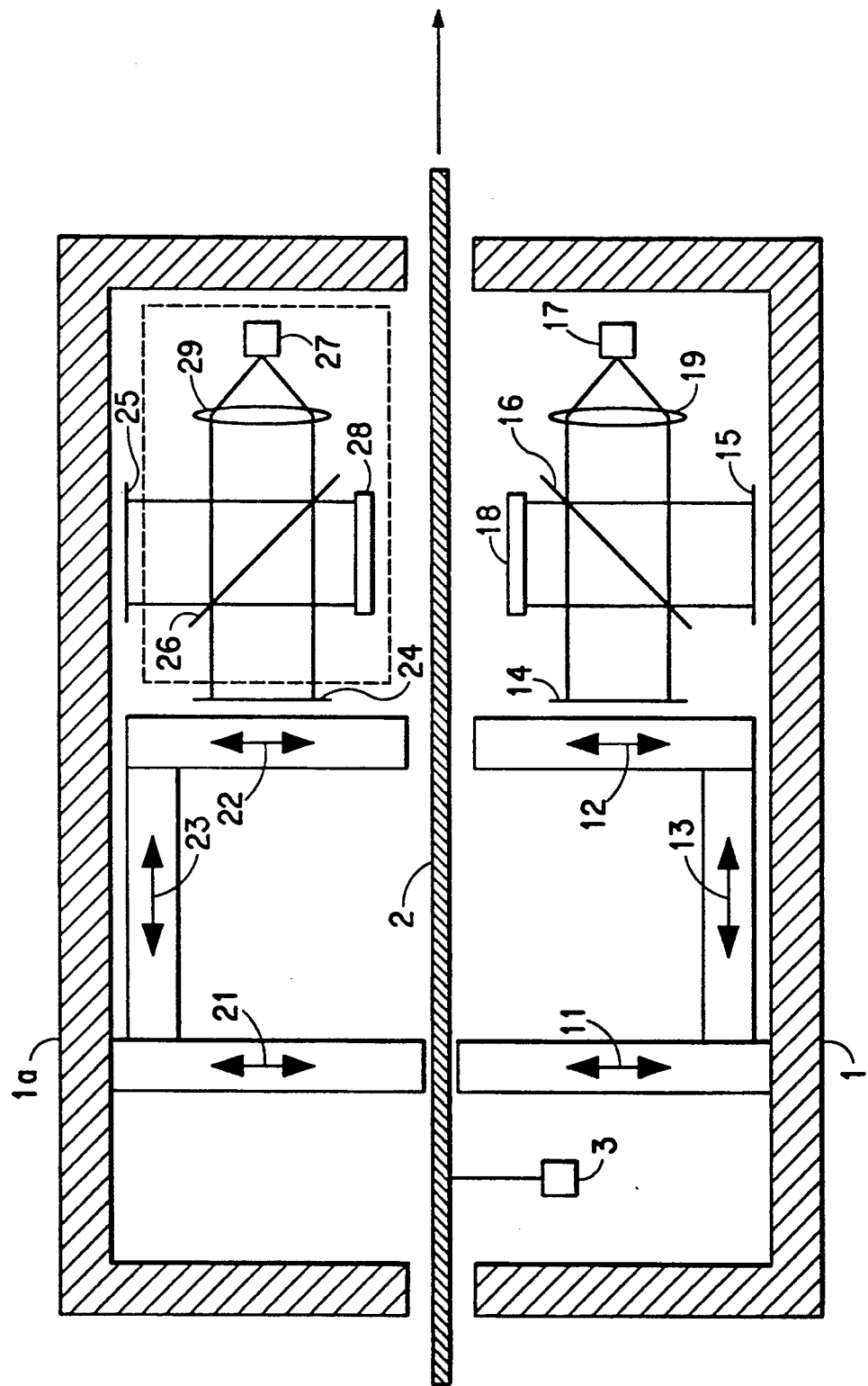
FIG. 1 depicts a transport device in accordance with the instant invention.

FIG. 1 shows a longitudinal cross section through a transport device of the invention for material in roll or sheet form (2), which is moved past an image recording device (3), for example a laser with a sweep device operating perpendicular to the plane of the paper, the movement occurring relative to a fixed framework consisting of an upper section (1a) and a lower section (1). A first clamping device attached to the framework (1), (1a) consists of two piezotranslators (11) and (21) whose direction of elongation runs perpendicular to the material (2) and which, on being actuated by the application of sufficient electrical voltage, grip the material. A second clamping device consists of the piezotranslators (12) and (22) whose direction of elongation is similarly oriented perpendicular to the material (2). These are linked in a mobile manner with respect to the framework (1), (1a) through the piezotranslators (13) and (23) respectively with the ends of the piezotranslators (13) and (23) are positioned so that, if actuated by the application of a voltage, they enlarge the spacing between the two clamping devices, that is, between (11) and (12) or between (21) and (22) respectively. The movements of the piezotranslators are indicated by double-headed arrows. A mirror (14 is attached to the second clamping device, the piezotranslator (12). Another mirror (15), a semi-transparent mirror (16) and a photoelectric detector are attached to the framework (1) in a manner so that, with a source of coherent, monochromatic, parallel light (measurement light), for example a laser diode (17) with a beam-widening lens (19), it forms a Michelson interferometer. Optionally, there can be a second interferometer assembly, consisting of the mirror (24) attached to the piezotranslator (22), the mirror (25), the semi-transparent mirror (26), the light source (27), (29) and the detector (28), all attached to the upper section (1a) of the framework.

Figure 2:
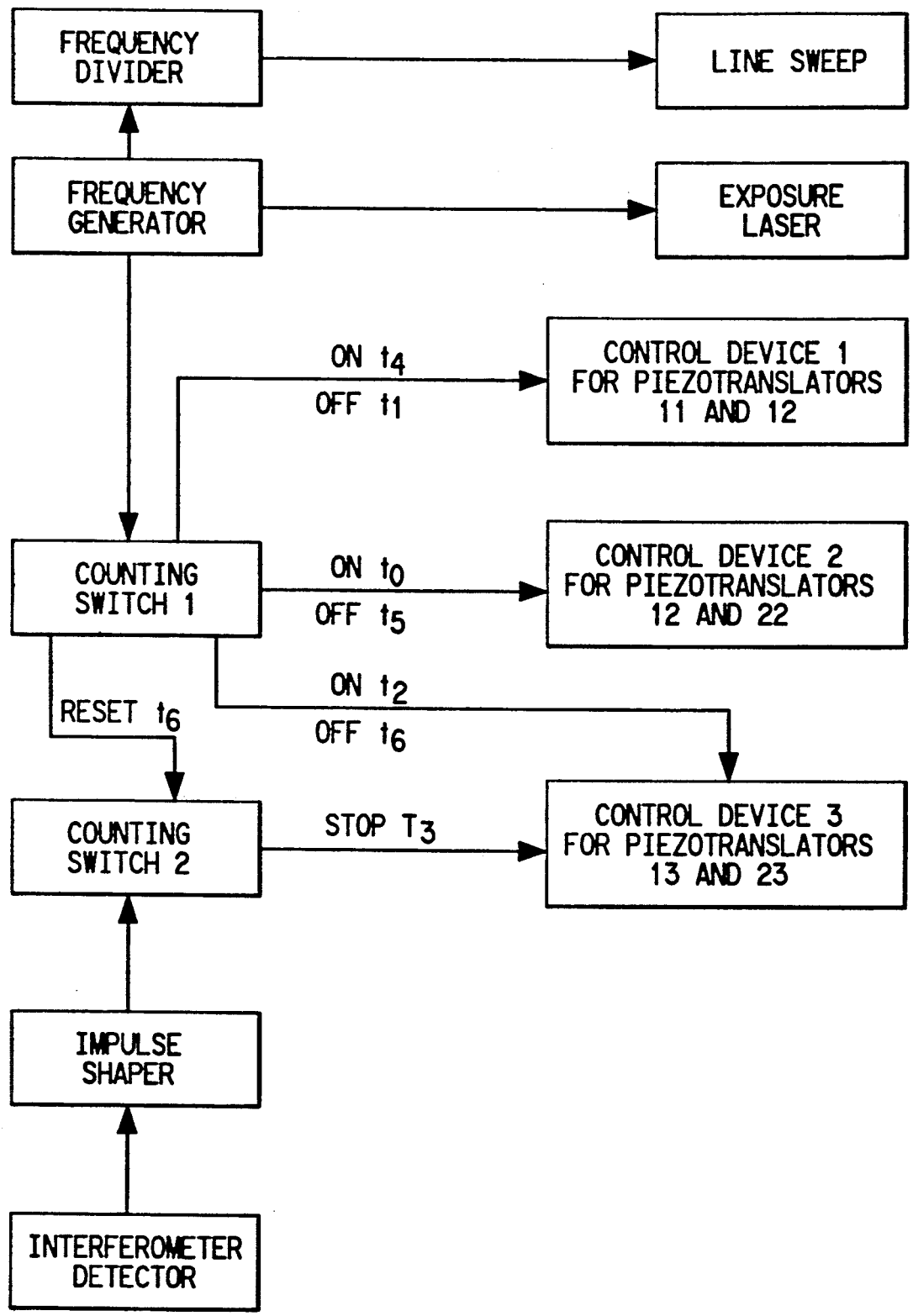
FIG. 2 is a block diagram of a preferred embodiment of the instant invention.

FIG. 2 shows a block diagram of the electrical and electronic accessories. A frequency generator produces a frequency of, for example, 10 mHz and controls the exposure laser that emits light flashes with the same frequency modulated according to the image data stored and to be recorded. A frequency divider operates so that, after a specific number of laser flashes, the horizontal sweep process starts from the beginning and a new line is retrieved from the stored image data. An appropriate pause is also provided for the line return. For example, if $3 \times 2^{10} = 3072$ dots are recorded in each scanning line for a recording width of about 30 centimeters and a density of 100 dots per centimeter, the line return can take place during the following $2^{10} = 1024$ impulses from the frequency generator, so that about 250 lines can be written per second. The same base frequency that controls the exposure laser and the line advance, can now also serve to control the transport system. For this purpose is provided a counting switch 1, which emits to each of the three control mechanisms for the three groups of piezotranslators at predetermined times an "on" or "off" signal within a time interval corresponding to $2^{12} = 4096$ cycles of the base frequency. These times are designated as $t_0$, $t_1$, $t_2$, $t_4$, $t_5$ and $t_6$. A counting switch 2 is reset by the "on" signal for control mechanism 3 and receives a signal from the interferometer detector. When the counting switch 2 has counted a specific preselected number of detector signal impulses, it sends a stop signal to control mechanism 3.

Figure 3:
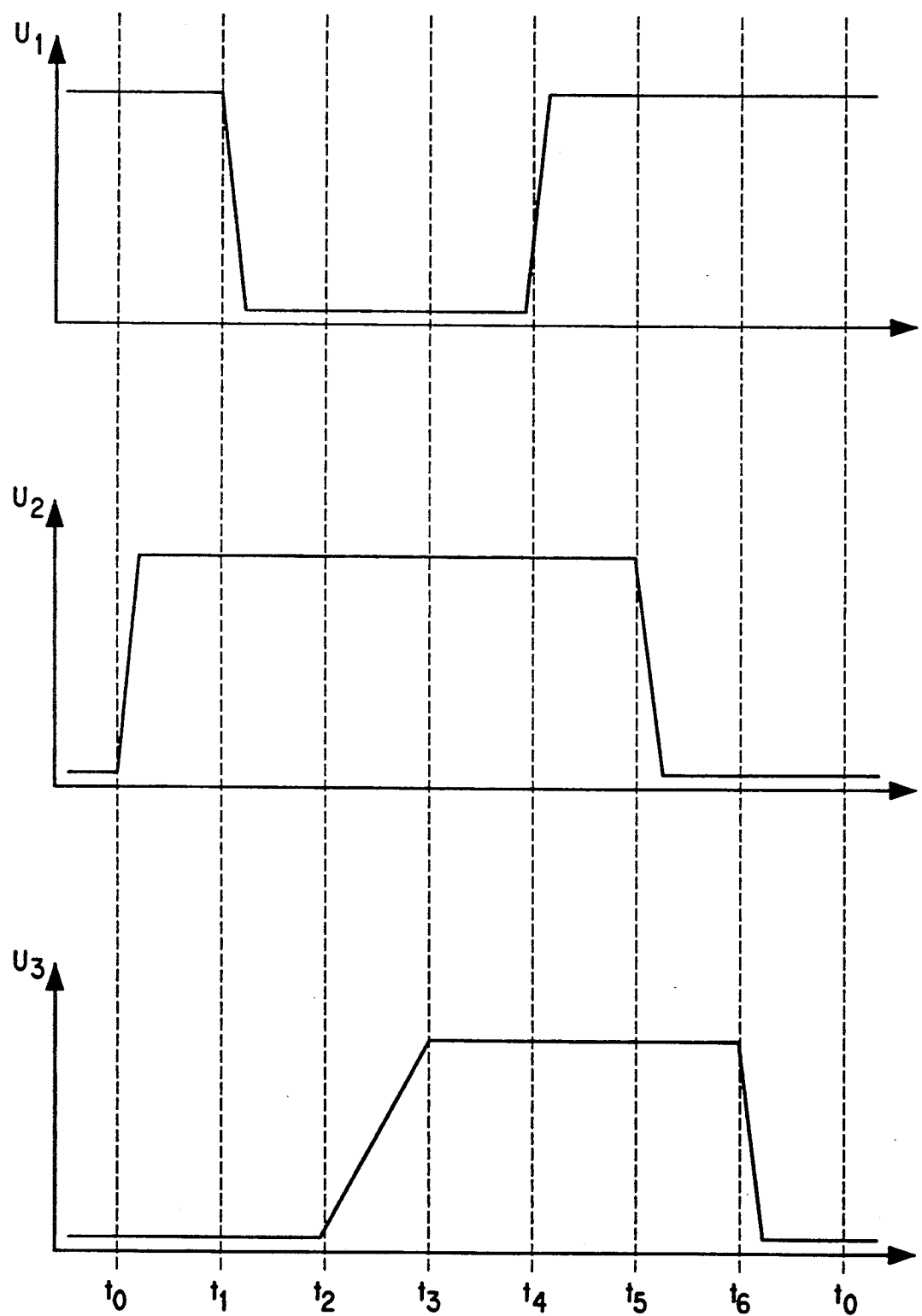
FIG. 3 depicts a timing diagram for a preferred embodiment of the instant invention.

The transport step cycle can be seen more clearly in FIG. 3 illustrating the chronological course of the voltage emitted from the control mechanisms and applied to the piezotranslators. (The axes of this diagram are not according to scale.) At time $t_0$, control mechanism 1 delivers the maximum voltage; as a result, the first clamping device with piezotranslators (11) and (21) is closed. Translators (13 and 23) of the third group receive from control mechanism 3 the minimum voltage and consequently are at their minimum length. Control mechanism 2 receives from counting switch 1 an "on" signal, at which the second clamping device of translators (12) and (22) closes. A time $t_1$, control mechanism 1 receives an "off" signal and the first clamping device opens. At $t_2$, control mechanism 3 receives an "on" impulse. At this, the voltage $U_3$ applied to piezotranslators (13) and (23) begins to rise, the piezotranslators are stretched and move the second clamping device, holding the material, in the direction of transport. Due to the movement of the mirror (14) attached to the second clamping device, interference lines now run through the photodetector (18), which delivers a corresponding signal through an impulse shaper to the counting switch 2. The impulse shaper delivers a spike impulse at each peak value or at each reversal point of the detector signal. After a certain predetermined impulse number to time $t_3$, counting switch 2 sends a stop signal to control mechanism 3 and the voltage $U_3$ does not rise further. It is advisable to let voltage $U_3$ that affects the actual transport rise more slowly than voltages $U_1$ and $U_2$, which only close the clamping devices, in order to limit the forces required by the inertia of the material. On the other hand, the time interval $t_2-t_3$ obviously must expire completely during the line return. Due to the elongation of piezotranslators (13) and (23), the second clamping device (12), (22) holding the material at this time is moved in the direction of transport, taking the material along with it by the corresponding step length with the aid of the preselected impulse number from counting switch 2. At time $t_4$, counting switch 1 sends an "on" signal to control mechanism 1 and the first clamping device (11), (21) closes. Now the material is motionless relative to the framework and a line can be recorded. During or after this recording, the second clamping device (12), (22) is opened by an "off" impulse to control mechanism 2 (time $t_5$). After this, at time $t_6$, control mechanism 3 also receives an "off" impulse, voltage $U_3$ returns to the minimum value and piezotranslators (13) and (23) contract to minimum length. Simultaneously, counting switch 2 is reset by an impulse from counting switch 1. This ends a transport step and the device is again in the same state as at time $t_0$.

The example described above is submitted for illustrative purposes only, and is not intended to limit the scope of the invention as recited in the appended claims.

What is claimed is:

1. A method for the stepwise transport of a material in roll or sheet form through an image recording or scanning device, comprising:
   a) alternately gripping the material with at least one pair of clamping devices, each of said clamping devices comprising first and second members disposed to clamp the material therebetween, wherein at least one of said first and second members comprises a piezotranslator;
   b) moving the clamping devices toward or away from one another in the direction of transport in the same alternating rhythm with driving means, said driving means comprising a first driving piezotranslator affixed to the first members of the pair of clamping devices and a second driving piezotranslator affixed to the second members of the pair of clamping devices;
   c) continuously measuring the change in spacing between the at least one pair of clamping devices with at least one optical interferometer assembly in operative association with said at least one pair of clamping devices; and
   d) terminating step b) when a predetermined step length has been achieved.

2. A method in accordance with claim 1, characterized in that a Michelson interferometer with a photoelectric detector is used as the interferometer assembly.

3. A method in accordance with claim 2, characterized in that the detector output signal is passed through an impulse generator that generates spike impulses at the peak values or at the reversal points of the signal.

4. A method in accordance with claim 2, characterized in that the rise in the actuation voltage for the driving piezotranslators which move the two clamping device towards and away from each other during the transport step, is interrupted if the output signal from the detector has passed through a predetermined number of peaks or reversal points counted from the beginning of the movement.

5. A method in accordance with claim 3, characterized in that the rise in the actuation voltage for the driving piezotranslators which move the two clamping device towards and away from each other during the transport step, is interrupted if the output signal from the detector has passed through a predetermined number of peaks or reversal points counted from the beginning of the movement.

6. A method in accordance with claim 1, characterized in that the chronological sequence of the transport steps is synchronized with the line return of the image scanning or recording device.

7. A method in accordance with claim 2, characterized in that the chronological sequence of the transport steps is synchronized with the line return of the image scanning or recording device.

8. A method in accordance with claim 3, characterized in that the chronological sequence of the transport steps is synchronized with the line return of the image scanning or recording device.

9. A method in accordance with claim 4, characterized in that the chronological sequence of the transport steps is synchronized with the line return of the image scanning or recording device.

10. A method in accordance with claim 6, characterized in that the signals for the actuation of the clamping devices for the beginning of the transport step and for the line return are derived from a common base signal for the dotwise image recording or scanning.

11. A method in accordance with claim 7, characterized in that the signals for the actuation of the clamping devices for the beginning of the transport step and for the line return are derived from a common base signal for the dotwise image recording or scanning.

12. A method in accordance with claim 8, characterized in that the signals for the actuation of the clamping devices for the beginning of the transport step and for the line return are derived from a common base signal for the dotwise image recording or scanning.

13. A method in accordance with claim 9, characterized in that the signals for the actuation of the clamping devices for the beginning of the transport step and for the line return are derived from a common base signal for the dotwise image recording or scanning.

14. An apparatus for the stepwise transport of a material in roll or sheet form, comprising:
   a) a framework;
   b) at least one pair of clamping devices disposed within said framework, each of said clamping devices comprising first and second members disposed to clamp material therebetween, wherein at least one of said first and second members comprises a piezotranslator;

c) driving means for moving the clamping devices toward and away from one another in the direction of transport, said driving means comprising a first driving piezotranslator affixed to the first members of the pair of clamping devices and a second driving piezotranslator affixed to the second members of the pair of clamping devices; and d) at least one optical interferometer assembly in operative association with said at least one pair of clamping devices, wherein the output signal of the optical interferometer assembly is a specific function of the relative distance between the clamping devices.

15. A transport apparatus in accordance with claim 14, characterized in that one clamping device is linked fast with the framework, while the other can be moved relative to the framework by the driving piezotranslators.

16. A transport apparatus in accordance with claim 14, characterized in that the interferometer assembly has a Michelson interferometer and a photoelectric detector.

17. A transport apparatus in accordance with claim 15, characterized in that the interferometer assembly has a Michelson interferometer and a photoelectric detector.

18. A transport apparatus in accordance with claim 16, characterized in that one end mirror of the Michelson interferometer is fastened on the second clamping device and the other on the framework.

19. A transport apparatus in accordance with claim 17, characterized in that one end mirror of the Michelson interferometer is fastened on the second clamping device and the other on the framework.

20. A transport apparatus in accordance with claim 14, characterized in that an interferometer assembly is provided for driving each piezotranslator.

21. A transport apparatus in accordance with claim 15, characterized in that an interferometer assembly is provided for each piezotranslator of the third group.

22. A transport apparatus in accordance with claim 16, characterized in that an interferometer assembly is provided for each piezotranslator of the third group.

23. A transport apparatus in accordance with claim 17, characterized in that an interferometer assembly is provided for each piezotranslator of the third group.

24. A transport apparatus in accordance with claim 18, characterized in that an interferometer assembly is provided for each piezotranslator of the third group.

25. A transport apparatus in accordance with claim 19, characterized in that an interferometer assembly is provided for each piezotranslator of the third group.

26. Transport device in accordance with claim 14, characterized in that each pair of clamping devices is distributed in multiple installations over the width of the recording or scanning device.

27. Transport device in accordance with claim 15, characterized in that each pair of clamping devices is distributed in multiple installations over the width of the recording or scanning device.

28. Transport device in accordance with claim 16, characterized in that each pair of clamping devices is distributed in multiple installations over the width of the recording or scanning device.

29. Transport device in accordance with claim 17, characterized in that each pair of clamping devices is distributed in multiple installations over the width of the recording or scanning device.

30. Transport device in accordance with claim 18, characterized in that each pair of clamping devices is distributed in multiple installations over the width of the recording or scanning device.

31. Transport device in accordance with claim 19, characterized in that each pair of clamping devices is distributed in multiple installations over the width of the recording or scanning device.

32. Transport device in accordance with claim 20, characterized in that each pair of clamping devices is distributed in multiple installations over the width of the recording or scanning device.

33. Transport device in accordance with claim 21, characterized in that each pair of clamping devices is distributed in multiple installations over the width of the recording or scanning device.

34. Transport device in accordance with claim 22, characterized in that each pair of clamping devices is distributed in multiple installations over the width of the recording or scanning device.

35. Transport device in accordance with claim 23, characterized in that each pair of clamping devices is distributed in multiple installations over the width of the recording or scanning device.

36. Transport device in accordance with claim 24, characterized in that each pair of clamping devices is distributed in multiple installations over the width of the recording or scanning device.

37. Transport device in accordance with claim 25, characterized in that each pair of clamping devices is distributed in multiple installations over the width of the recording or scanning device.

38. Transport device in accordance with claim 26, characterized in that each pair of clamping devices is present in two installations that frame the edges of the material to be transported.

39. Transport device in accordance with claim 27, characterized in that each pair of clamping devices is present in two installations that frame the edges of the material to be transported.

40. Transport device in accordance with claim 28, characterized in that each pair of clamping devices is present in two installations that frame the edges of the material to be transported.

41. Transport device in accordance with claim 29, characterized in that each pair of clamping devices is present in two installations that frame the edges of the material to be transported.

42. Transport device in accordance with claim 30, characterized in that each pair of clamping devices is present in two installations that frame the edges of the material to be transported.

43. Transport device in accordance with claim 31, characterized in that each pair of clamping devices is present in two installations that frame the edges of the material to be transported.

44. Transport device in accordance with claim 32, characterized in that each pair of clamping devices is present in two installations that frame the edges of the material to be transported.

45. Transport device in accordance with claim 33, characterized in that each pair of clamping devices is present in two installations that frame the edges of the material to be transported.

46. Transport device in accordance with claim 34, characterized in that each pair of clamping devices is present in two installations that frame the edges of the material to be transported.

47. Transport device in accordance with claim 35, characterized in that each pair of clamping devices is present in two installations that frame the edges of the material to be transported.

48. Transport device in accordance with claim 36, characterized in that each pair of clamping devices is present in two installations that frame the edges of the material to be transported.

49. Transport device in accordance with claim 37, characterized in that each pair of clamping devices is present in two installations that frame the edges of the material to be transported.

* * * * *